US008088013B2

(12) United States Patent
Abe et al.

(10) Patent No.: US 8,088,013 B2
(45) Date of Patent: Jan. 3, 2012

(54) GAMING MACHINE

(75) Inventors: Takashi Abe, Tokyo (JP); Hideaki Kishi, Tokyo (JP); Yuya Konno, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 863 days.

(21) Appl. No.: 12/124,754

(22) Filed: May 21, 2008

(65) Prior Publication Data

US 2009/0005178 A1 Jan. 1, 2009

(30) Foreign Application Priority Data

Jun. 27, 2007 (JP) ................................ 2007-169775

(51) Int. Cl.
*A63F 13/08* (2006.01)

(52) U.S. Cl. ............ 463/46; 463/29; 361/727; 361/724; 361/725; 361/726; 312/223.1

(58) Field of Classification Search .................... 463/29, 463/46; 361/727, 724, 725, 726; 312/223.1
See application file for complete search history.

(56) References Cited

U.S. PATENT DOCUMENTS 6,201,703 B1 * 3/2001 Yamada et al. ............... 361/752
6,491,298 B1 * 12/2002 Criss-Puszkiewicz et al. ......................... 273/148 R
6,688,984 B2 * 2/2004 Cole ............................... 463/46
6,699,128 B1 * 3/2004 Beadell et al. .................. 463/46
7,118,483 B2 10/2006 Beadell et al.
7,513,830 B2 * 4/2009 Hajder et al. ................... 463/46
7,846,026 B2 * 12/2010 Stephenson et al. ............ 463/46
7,862,435 B1 * 1/2011 Schreiber ........................ 463/46
2004/0087374 A1 * 5/2004 Cole ............................... 463/46
2008/0009353 A1 * 1/2008 Halic et al. ...................... 463/46

FOREIGN PATENT DOCUMENTS

EP 0896306 2/1999
WO 2005015968 2/2005

OTHER PUBLICATIONS

Extended European Search Report issued to EP Application No. 08011447.3, mailed May 27, 2009.

* cited by examiner

*Primary Examiner* — Peter DungBa Vo
*Assistant Examiner* — Matthew Russell
(74) *Attorney, Agent, or Firm* — NDQ& M Watchstone, LLP

(57) ABSTRACT

A gaming machine includes a first box having inner walls, a second box, a front member, a communicating portion, and an exhausting portion. The front member has side walls, and covers components placed at a front portion of the second box. The front member defines a first space at the front portion. The communicating portion provided at the front portion allows a second space inside the second box to communicate with the first space. The exhausting portion provided in a side wall of the front member allows air sent from the second space to the first space to be discharged. The front member is arranged such that a first distance is smaller than a second distance, where the first distance starts at a first inner wall to finish at a first side wall, and the second distance starts at a second inner wall to finish at a second side wall.

13 Claims, 10 Drawing Sheets

GAMING MACHINE

This application is based on and claims the benefit of priority from Japanese Patent Application No. 2007-169775, filed on 27 Jun. 2007, the content of which is incorporated herein by reference.

BACKGROUND OF THE INVENTION

1. Field of the Invention

The present invention relates to a gaming machine such as a slot machine.

2. Related Art

Gaming machines installed in an amusement facility such as a casino that is open 24 hours a day operate 24 hours without downtime, except for maintenance work. Therefore, the gaming machines in the amusement facility that is open 24 hours a day are at an increased risk of being easily tampered with for devices such as: CPU and a control board provided in a CPU chassis in a cabinet of the gaming machine, as well as various devices provided at a front face of the CPU chassis, which are necessary for performing a game. Therefore, it is preferable that components indispensable for normal operation of a gaming machine, such as the CPU and the control board, are covered by a box-shaped CPU chassis to protect against tampering.

On the other hand, in recent years, game programs executed in a game in a gaming machine and system programs operating a gaming machine tend to be updated frequently in a short period of time. The updating of programs as described above is conducted, for example, by replacing a storage medium with new one storing in advance an updated program, or loading a program distributed from a server into ROM in a gaming machine. Therefore, it is preferable that the abovementioned storage medium, a connector for connecting and disconnecting a cable to the server, and the like are provided at a front portion of the CPU chassis in order to shorten, whenever possible, the downtime necessary for program updating and maintenance. However, the storage medium and the connector that are provided at the front portion of the CPU chassis are at increased risk of tampering.

For example, U.S. Pat. No. 7,118,483 discloses a gaming machine including a CPU chassis (a second chassis) inside a chassis (a first chassis). The CPU chassis houses a CPU and a control board so as to protect them. More specifically, the CPU chassis of a box-shape in this gaming machine houses the CPU, the control board, and the like. Furthermore, a storage medium can be inserted into a front portion of the CPU chassis, and also cables can be attached and detached at the front portion of the CPU chassis. At the front portion of the CPU chassis, an openable and closable front door (a front member) is provided so as to provide shielding against attempts at tampering applied to the storage medium and the connector capable of connecting and disconnecting cables. In addition, a plurality of heat rejecting vents including a plurality of small through-bores is formed on both side portions of the CPU chassis so that heat generated in the CPU chassis can be dissipated through the through-bores.

However, along with the improvement of game contents and more sophistication of rendered effects in order to provide more excitement, a CPU of high performance and speed compared to a conventional CPU tends to be used more often in order to achieve highly complicated controls in a game. In this way, electric power consumption of the CPU in a recent gaming machine tends to increase. Accordingly, the heat generated by the CPU and various devices, which are controlled by the CPU and necessary for performing a game, tends to increase.

Consequently, the gaming machine disclosed in U.S. Pat. No. 7,118,483, which only has heat rejecting vents on both side portions of the CPU chassis, cannot cope with an amount of increasing heat as described above. This may cause the heat to be trapped in the CPU chassis. It may be possible to increase heat rejecting vents so as to allow the heat in the CPU chassis or at the front portion of the CPU chassis to be dissipated. However, if more heat rejecting vents are provided, it is easier to manipulate the inside and the front portion of the CPU chassis. This raises a problem that various devices such as the CPU and the control board inside the CPU chassis, and a storage medium, a connector, and the like disposed at the front portion of the CPU chassis, are at an increased risk of tampering.

SUMMARY OF THE INVENTION

The present invention provides the gaming machine that implements not only security but also efficient heat dissipation for the various devices inside the CPU chassis and at the front portion of the CPU chassis.

In an aspect of the present invention, a gaming machine is provided, which includes a first box having inner walls, a second box, a front member, a communicating portion, and an exhausting portion. The second box is housed by the first box, and houses a control board that includes a central processing unit for controlling a game. The front member has side walls and covers components required for executing the game placed at a front portion of the second box while the front portion of the second box is closed. The front member defines a first space at the front portion of the second box. The communicating portion that is provided at the front portion of the second box allows a second space inside the second box to communicate with the first space. The exhausting portion that is provided in a side wall of the front member allows air sent from the second space inside the second box to the first space to be discharged. The front member is arranged to lie such that a first distance is smaller than a second distance, where the first distance starts at a first inner wall at an end portion of the first box to finish at a first side wall at an end portion of the front member, and the second distance starts at a second inner wall at the opposite end portion of the first box to finish at a second side wall at the opposite end portion of the front member.

The gaming machine described above can protect the control board in the second box and the components placed at the front portion of the second box. At the same time, the gaming machine can discharge the heat dissipated by the control board and the components via the communicating portion and the exhausting portion. In this way, the gaming machine can not only maintain the security but also efficiently dissipate the heats dissipated inside.

In another aspect of the present invention, a gaming machine is provided, which further includes an extending portion and a hinge. The extending portion extends forward from a bottom of the second box. The hinge that is provided a front end portion of the extending portion pivotally supports the front member.

The gaming machine described above allows the front member to be opened and closed. In addition, it can discharge the air in the space defined by the front member and the front portion of the second box via gaps at the front end of the extending portion where there are no hinges. In this way, the gaming machine implements efficient heat rejection.

In still another aspect of the present invention, a gaming machine is provided, which further includes a plurality of cables and a bonding portion. The plurality of cables extends from the front portion of the second box to the first space, further extending out of the first space via the exhausting portion. The bonding portion that bonds the plurality of cables is arranged to lie closer to the exhausting portion between the exhausting portion and the front portion of the second box from which the plurality of cables starts to extend.

With the gaming machine described above, it is possible to bond the plurality of cables adjacent to the exhausting portion so as to prevent adversely affecting the heat rejection by blocking the exhausting portion.

In yet another aspect of the present invention, a gaming machine further including a front door is provided. The front door is placed at a front of the first box and pivotally supported about an axis that extends along an end portion of the first box so as to be in open and closed positions.

The front door described above serves as a door that opens and closes the first box. Since the exhausting portion is configured to lie adjacent to the axis at the end portion of the first box, the gaming machine does not allow for a space to be used for accessing to the exhausting portion while the front member inside the first box is exposed with the front door being in an open position. In this way, it is possible to prevent dishonest acts not only for the components at the front portion of the second box via the exhausting portion, but also for the control board inside the second box via the exhausting portion and the communicating portion.

In the further aspect of the present invention, a gaming machine is provided, which includes a pressing portion provided in the front member, a support portion, and a biasing member. The support portion faces the pressing portion while the front member is in a closed position. The biasing member biases the support portion toward the pressing portion.

With the gaming machine described above, it is possible to reinforce a force for holding the front member in a closed position so as to prevent rattling.

In a still further aspect of the present invention, a gaming machine is provided, which further includes a first sensor that detects the transition of the front member from a closed position to an open position. The first sensor outputs first information related to releasing of the closed position when the front member changes from a closed position to an open position.

With the gaming machine described above, it is possible to raise an alarm about opening of the front member, receiving the first information sent from the first sensor. This maintains the security of the inside and the front portion of the second box.

In a yet further aspect of the present invention, a gaming machine is provided, which further includes a first memory that stores the first information sent from the first sensor.

With the gaming described above, it is possible to store the first information in the first memory so as to keep a log.

In another aspect of the present invention, a gaming machine is provided, which further includes a second memory that stores the first information sent from the first sensor.

With the gaming machine described above, it is possible to store the first information in both first and second memories. This implements keeping a more robust log.

In a still another aspect of the present invention, a gaming machine is provided, which further includes a second sensor that detects the transition of the front member from a closed position to an open position. The second sensor outputs second information related to releasing of the closed position when the front member changes from a closed position to an open position.

With the gaming machine described above, it is possible to raise an alarm about opening of the front member, receiving the second information sent from the second sensor in addition to the first information sent from the first sensor. This implements the security of the inside and the front portion of the second box.

In a yet another aspect of the present invention, a gaming machine is provided, in which the gaming machine is communicatively connected with a server, and the second information sent from the second sensor is transmitted to the server.

Since the gaming machine described above transmits the second information to the server, the server can also watch whether the front member is in an open position or a closed position.

In a further aspect of the present invention, a gaming machine is provided, in which the first box includes a mounting device and a cutout. The second sensor is attached to the mounting device so as to face a back portion of the second box. The cutout allows the mounting device to pass and is provided in the back portion of the second box.

With the gaming machine described above, it is possible to attach and detach the second box from the first box without interference by the support of the second sensor. Also, it is possible to have the cutout covered by the support while the second box is installed inside the first box. This enables attachment and detachment of the second box to be easy with respect to the first box, while the security of the back portion of the second box is maintained.

In a still further aspect of the present invention, a gaming machine is provided, which further includes a rotational support portion and a first end portion. The rotational support portion is rotatably provided at the front member. The second box has a convex portion provided at a front portion thereof, the convex portion extending inside the second box. The first end portion of the rotational support portion has a first locking part that locks the convex portion. The rotational support portion is switchable between a locked position and a released position, wherein when the rotational support portion is in a locked position, the rotational support portion allows the first locking part to lock the convex portion such that the front member is maintained in a closed position, and when the rotational support portion is in a released position, the rotational support portion allows the first locking part to release the convex portion such that the front member is openable.

With the gaming machine described above, it is possible to set the front member in an open position or a closed position through selecting the locked position or the released position of the rotational support portion. When the first locking part locks the convex portion in the locked position such that the front member is held in a closed position, it is possible to prevent the front member from being easily opened. This implements more robust security for the inside and the front portion of the second box.

In a yet further aspect of the present invention, a gaming machine is provided, in which the first box has a flapping portion that extends from the first inner wall to the second inner wall and extends downward toward the front portion of the second box, a second end portion of the rotational support portion has a second locking part, and while the first locking part locks the convex portion, the second locking part locks the flapping portion such that the front member is maintained in a closed position.

The gaming machine described above can more securely maintain the front member in a closed position with the first and second locking parts locked with the convex portion and the flapping portion, respectively. This increases the security of the inside and the front portion of the second box.

In another aspect of the present invention, a gaming machine is provided, wherein the front member includes a locking device.

With the gaming machine described above, it is possible to lock the front member in a closed position while maintaining the rotational support portion in a locked position.

The gaming machine according to the present invention can not only maintain the security, but also reject heat dissipated by the various components inside and at the front portion of the second box.

DETAILED DESCRIPTION OF THE INVENTION

An embodiment of the present invention is described below with reference to the accompanying drawings.

Figure 1:
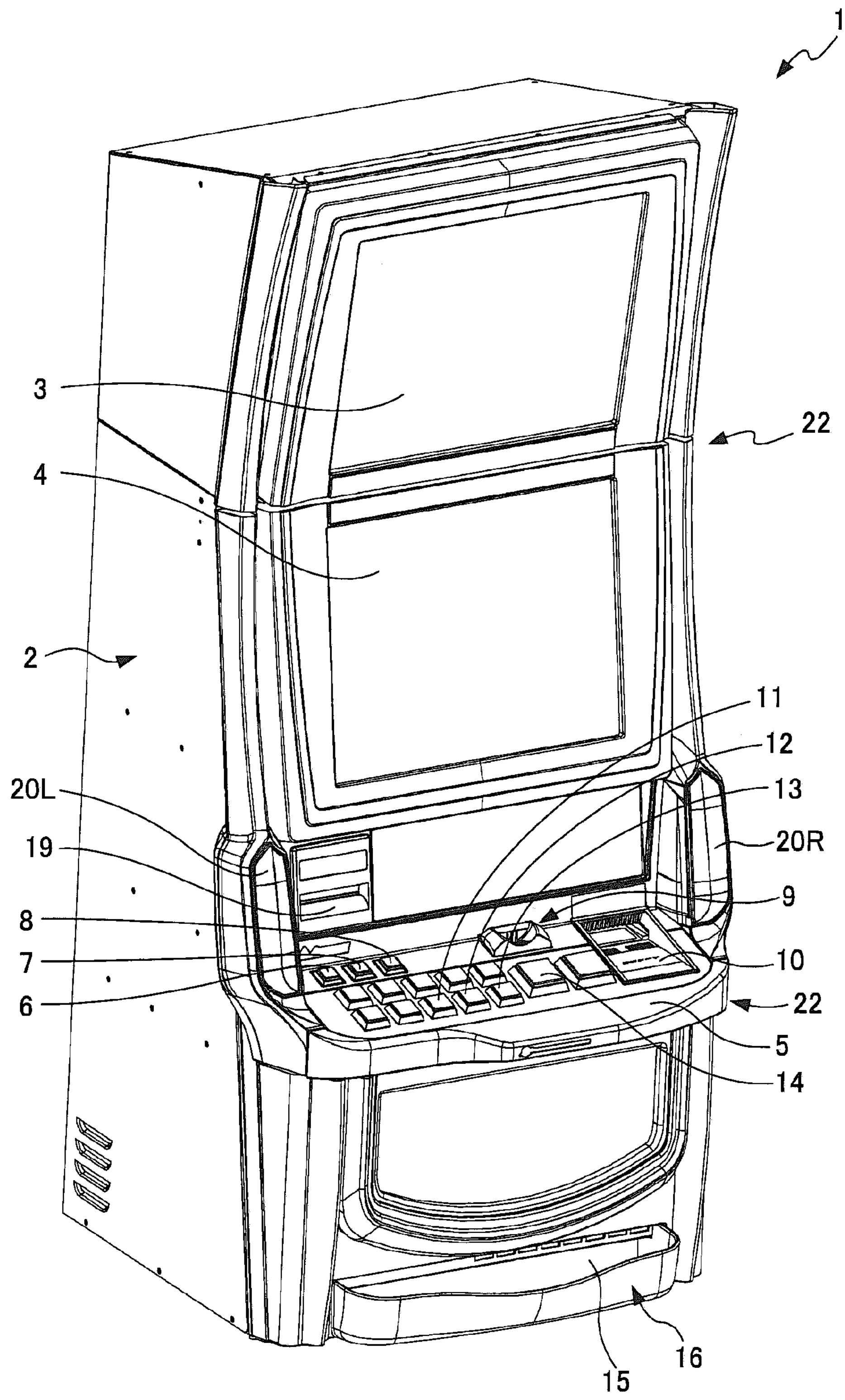
FIG. 1 is a perspective view showing an external appearance of a gaming machine according to an embodiment of the present invention.

FIG. 1 is a perspective view showing a configuration of an external appearance of a gaming machine 1 according to an embodiment of the present invention. The gaming machine 1 is a so-called upright-shape slot machine installed at an amusement facility such as a casino. The gaming machine 1 is provided with a cabinet 2 as a first chassis housing electric or mechanical parts for executing a predetermined game mode and a front door 22 which opens and closes a front face of the cabinet 2. A sub display 3 is provided in an upper front portion of the cabinet 2. In addition, a main display 4 is provided below the sub display 3 in the front door 22.

The sub display 3 includes a liquid crystal display and displays an award table, which shows odds and the like indicating an award per single medal provided for a player winning the game, while the gaming machine 1 is in a base game or a standby state. The sub display 3 is tilted forward so as to allow a player to easily recognize the sub display 3, since the eye level of the player is positioned basically at a height of the main display 4.

The main display 4 is a variable symbol display panel which a player continuously views. The main display 4 includes a transparent touch panel that is disposed on its front side and a transparent liquid crystal display made of a translucent material that is secured to the front door 22. A transparent display window attached to the main display 4 allows peripheral surfaces of a plurality of reels 33L, 33C, and 33R (see FIG. 2 described later) provided within the cabinet 2 to be visibly recognizable. These reels 33L, 33C, and 33R are arranged within the cabinet 2 such that they confront the display window attached to the main display 4.

A plurality of types of symbols is arranged on the peripheral surface of each of the reels 33L, 33C, and 33R so that three symbols are displayed in each display window of the main display 4. In addition, paylines (not shown) that horizontally and obliquely traverse each display window are displayed on the main display 4.

Furthermore, various winning combinations have been predetermined based on a plurality of combinations of symbols. When a symbol combination matching a winning combination comes to rest along a payline, coins are discharged from the coin payout opening 15 (described later) according to the winning combination. Moreover, a typical way for arranging various symbols on a peripheral surface of a reel is to use a long seal printed with nine symbols, whose dimensions are compatible with the width and peripheral length of the reel. However, it may be alternatively possible to form the symbols in a different manner.

In the present embodiment, only a center line is set as a pay line. The pay line is displayed on the main display 4 when a player plays a game by rotating and stopping the reels by pressing the 1-bet button 11, the 3-bet button 12, or 5-bet button 13, and then pressing the spin button 14. On the contrary, when a player plays various bonus games obtained, which provide special gaming modes advantageous to the player, by pressing the 5-bet button 13, the pay line disappears from the main display 4.

A ticket printer 19 is installed on the left, below the main display 4, which outputs tickets with information in accordance with the displayed result on the main display 4.

A pedestal-shaped operating table 5, which a player can operate, is provided below the main display 4. On the operating table 5, a CHANGE button 6, a CASH-OUT button 7, and a HELP button 8 are disposed in this order from the left in FIG. 1. In addition, a coin insertion slot 9 and bill insertion slot 10 are provided on the right side of the HELP button 8. In addition, a 1-BET button 11, 3-BET button 12, and 5-BET button 13 are provided on a side closer to a player from the CHANGE button 6 in this order from the left in FIG. 1. In addition, a SPIN/REPEAT-BET button 14 (hereinafter, "a SPIN button") is disposed on the right side of the 5-BET button 13.

The CHANGE button 6 is pressed when exchanging a bill inserted into the bill insertion slot 10. The exchanged coins are discharged to a coin tray 16 through a coin payout opening 15, which is disposed at a lower portion of the cabinet 2. A CHANGE switch is attached to the CHANGE button 6. The CHANGE switch outputs a switch signal to a main CPU, etc. for controlling the gaming machine 1 in response to pressing of the CHANGE button 6.

The CASH-OUT button 7 is pressed when terminating a normal game. When the CASH-OUT button 7 is pressed, coins obtained in a game are discharged to the coin tray 16 from the coin payout opening 15, which is provided below the front door 22. A CASH-OUT switch is attached to the CASH-OUT button 7. A switch signal is output to the main CPU, etc. for controlling the gaming machine 1 in response to pressing of the CASH-OUT button 7.

The HELP button 8 is pressed in a case where an operation procedure, etc. of a game is unclear. When the HELP button 8 is pressed, a variety of help information is displayed on the sub display 3 and the main display 4. In addition, when a payout table is not displayed on the sub display 3 during the game, the payout table is displayed on the sub display 3 through pressing of the HELP button 8. A HELP switch is attached to the HELP button 8. A switch signal is output to the main CPU, etc. for controlling a game from the HELP switch 64 in response to pressing of the HELP button B.

A coin sensor is disposed in the coin insertion slot 9. When a coin is inserted into the coin insertion slot 9, the coin sensor outputs a coin detection signal to the main CPU, etc. In addition, a bill sensor is disposed in the bill insertion slot 10. When a bill is inserted into the bill insertion slot 10, the bill sensor outputs a bill detection signal to the main CPU for controlling the gaming machine 1.

The 1-bet button 11 is used to bet a coin one by one and can be pressed to bet up to three times. A 1-bet switch is connected to the 1-bet button 11. When the 1-bet button 11 is pressed, the 1-bet switch outputs a switch signal to a main CPU and the like, which control the gaming machine 1.

The 3-bet button 12 is pressed to start a game with 3 coins bet. A 3-bet switch is connected to the 3-bet button 12. When the 3-bet button 12 is pressed, the 3-bet switch outputs a switch signal to a main CPU and the like, which control the gaming machine 1. The 5-bet button 13 is pressed to start a game with 5 coins bet or to start a bonus game which provides a special gaming mode which is advantageous to the player. A 5-bet switch is connected to the 5-bet button 13. When the 5-bet button 13 is pressed, the 5-bet switch outputs a switch signal to a main CPU and the like, which control the gaming machine 1.

The spin button 14 is used as a game start button to start a game on condition that a bet has been made by way of the bet button 11, 12 or 13. The spin button 14 is pressed by a player to start rotation of reels (described later) so as to execute a game with the present bet amount or the previous bet amount. A spin switch is connected to the spin button 14. When the spin button 14 is pressed, the spin switch outputs a switch signal to a main CPU and the like, which control the gaming machine 1. In addition, bet amounts allowed for a player to wager by pressing the spin button 14 are 1, 2, 3, and 5.

In a lower portion of the front door 22, the coin payout opening 15 is formed and the coin tray 16 is provided, which receives coins discharged through the coin payout opening 15. A coin detector is provided inside the coin payout opening 15 for detecting the number of coins discharged through the coin payout opening 15.

In addition, speakers 20L and 20R for producing sound effects of a game for rendered effects are disposed on both left and right terminal portions of the front door 22, respectively.

Figure 2:
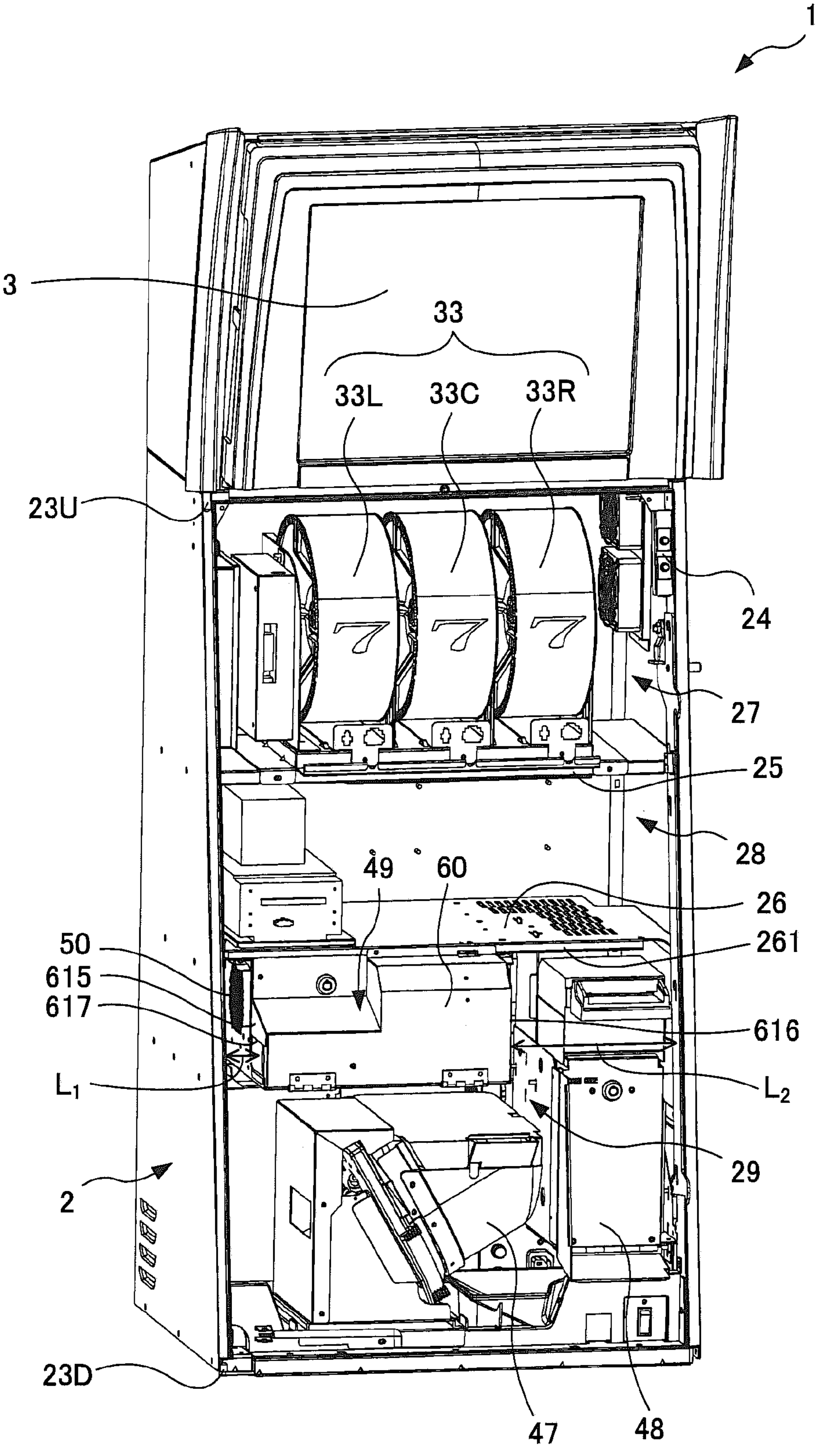
FIG. 2 is a perspective view showing an inner configuration of a cabinet according to the embodiment.

Next, an inner configuration of the cabinet 2 is described with reference to FIG. 2. FIG. 2 is a perspective view showing an inner configuration of the cabinet 2 of the gaming machine 1 with the front door 22 removed. As shown in FIG. 2, the cabinet 2 is a box-shaped cabinet having an opening in its front surface. The front door 22 is pivotally supported about an axis extending along one end portion of the cabinet 2 so as to open and close the opening of the cabinet 2. More specifically, supporting members 23U and 23D are attached to upper and lower portions of the one end portion of the cabinet 2. A top portion and a bottom portion of the front door are pivotally supported about the supporting members 23U and 23D, respectively. In addition, a door switch 24 for detecting opening and closing of the front door 22 is provided on an edge of the opposite end portion of the cabinet 2.

Inner space of the cabinet 2 is partitioned into a cabinet upper portion 27, a cabinet middle portion 28, and a cabinet lower portion 29 by an upper shelf board 25 and a lower shelf board 26.

A reel unit 33 having three reels 33L, 33C, and 33R is provided in the cabinet upper portion 27. Each of the reels 33L, 33C, and 33R is cylindrically-shaped, and is provided in the cabinet upper portion 27 with its peripheral surface facing to the main display 4 of the front door 22. The reel unit 33 rotatably supports these three reels 33L, 33C, and 33R, and includes a stepping motor (not shown) to rotate the reels 33L, 33C, and 33R.

A main control unit 49 including a control device 70 (described later), a hopper 47, and a collecting box 48 is provided in the cabinet lower portion 29.

The hopper 47 holds coins inserted from the coin insertion slot 9, and discharges a predetermined number of coins through the coin payout opening 15 disposed in the front door 22 via a coin shooter (not shown), in response to an instruction from the control device 70. The collect box 48 is a container for collecting and holding bills inserted through the bill insertion slot 10 disposed in the front door 22.

Figure 3:
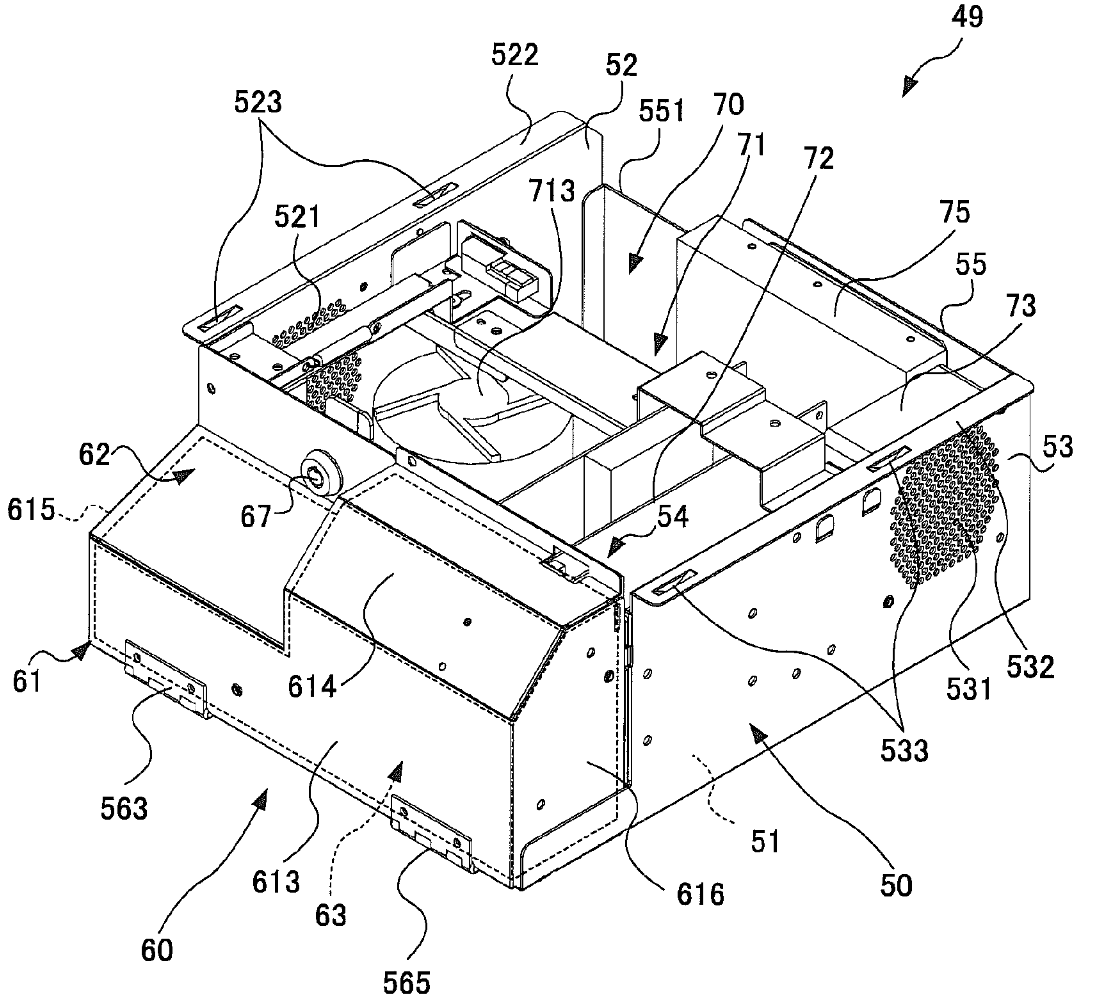
FIGS. 3 to 5 are perspective views each showing a configuration of a main control unit according to the embodiment.

Next, a configuration of the main control unit 49 is described with reference to FIGS. 3 to 6. FIG. 3 is a perspective view showing a configuration of the main control unit 49. As shown in FIG. 3, the main control unit 49 is composed of a control device 70 including a control board and the like for controlling a game, a CPU cabinet 50 as a second chassis for housing the control device 70, and a front cover 60 as a front member for opening and closing a front portion of the CPU cabinet 50.

The control device 70 includes a motherboard as a control board for controlling a game, a gaming board 72, a fan 73 for rejecting heat dissipated in the CPU cabinet 50, and a hard disk 75. The motherboard 71 using a commercially-produced general-purpose motherboard includes at least a main CPU and a first memory (not shown). The motherboard 71 is allocated horizontally in the cabinet 510. In addition, the main CPU of the motherboard 71 is provided with a CPU fan 713. The gaming board 72 includes at least a CPU and a second memory (not shown), which are connected to the motherboard 71. A game cartridge 74 in which information related to a game is stored is attachably and detachably connected to the gaming board 72 (see FIG. 4), which incorporates a game program stored in the game cartridge 74 into the motherboard 71. In addition, the gaming board 72 is connected perpendicularly with the motherboard 71.

Figure 4:
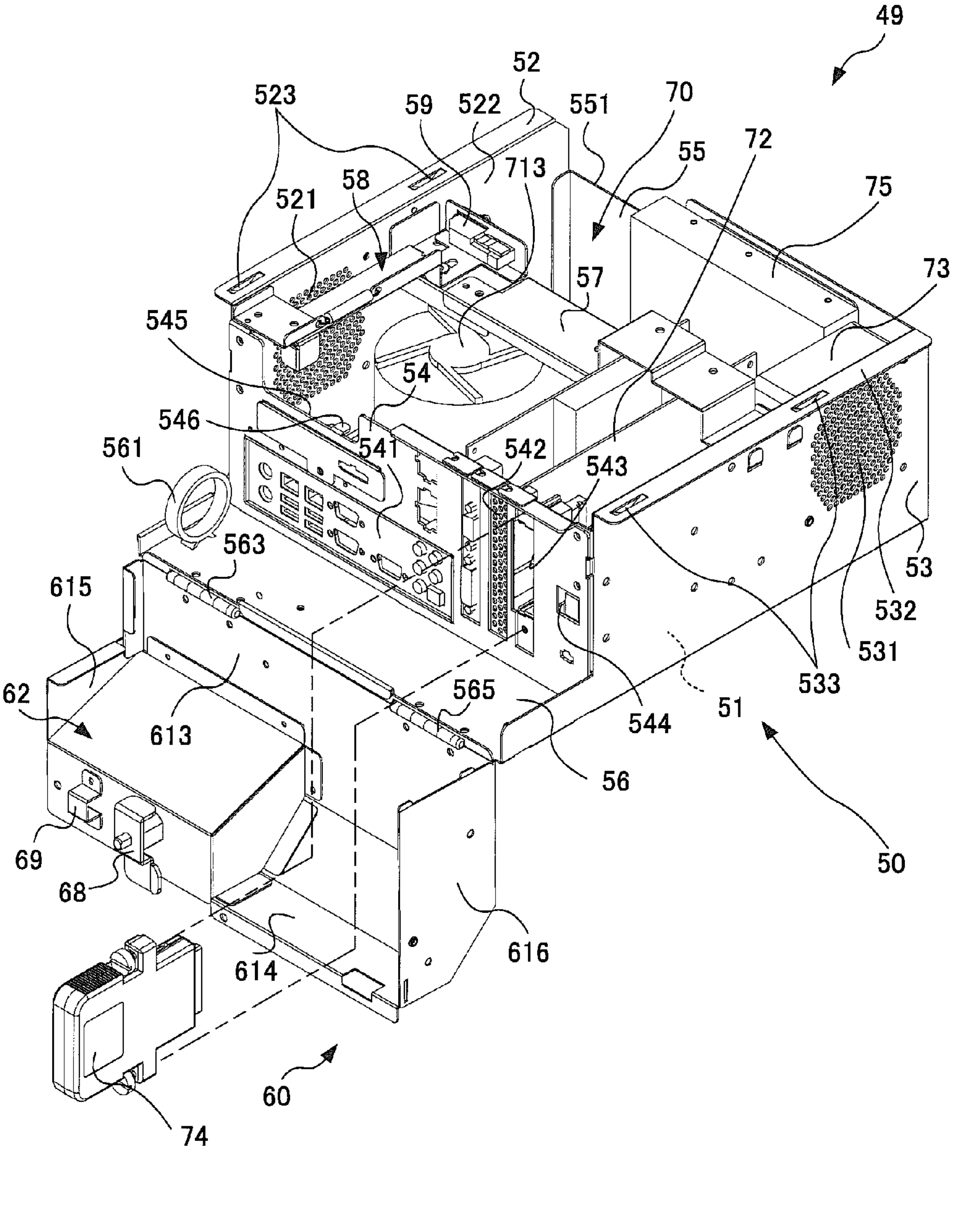

FIG. 4 is a perspective view showing a configuration of the main control unit 49. More specifically, FIG. 4 is a perspective view showing the main control unit 49, in which the front cover 60 is opened so that the front of the CPU cabinet 50 is exposed.

The CPU cabinet 50 is a container shaped like a rectangular parallelepiped, which has an opening in its upper face. More specifically, the CPU cabinet 50 is composed of a cabinet bottom portion 51 on which the motherboard 71 is placed, cabinet side portions 52 and 53 disposed vertically toward the cabinet bottom portion 51, and a cabinet front portion 54 and a cabinet back portion 55 disposed vertically toward the cabinet bottom portion 51.

Heat rejecting portions 521 and 531 including a plurality of through-bores are formed in the cabinet side portions 52 and 53. The abovementioned CPU fan 713 is disposed in a vicinity of the heat exhausting portion 521 of the cabinet side portion 52. Similarly, the abovementioned fan 73 is installed adjacent to the heat rejecting portion 531 provided in the cabinet side portion 53.

Plate-shaped bent portions 522 and 532 are disposed at top end portions of the cabinet side portions 52 and 53, respectively. These bent portions 522 and 532 are parallel with the cabinet bottom portion 51, and have fitting bores 523 and 533. In addition, a reinforcing member 57 perpendicularly bridges these cabinet side portions 52 and 53.

A connector panel 541 that electrically connects the abovementioned motherboard 71 and gaming board 72 with the other devices of the gaming machine 1 is attached to a lower portion of the cabinet front portion 54, which is closer to the cabinet bottom portion 51. A plurality of cables is connected with the connector panel 541. In addition, a rectangular-shaped first communicating portion 542 including a plurality of through-bores, a cartridge slot 543 in which the game cartridge 74 can be inserted, and a second communicating portion 544 including a rectangular through-bore are provided in a portion of the cabinet front portion 54, which is on the right side of the connector panel 541 (FIG. 4). A space in the CPU cabinet 50 communicates with a housing space 63 via the communicating portion 542 and/or the communicating portion 544, respectively.

A substantially rectangular-shaped cutout portion 545 is formed in an upper portion of the cabinet front portion 54. A plate-shaped convex portion 546 extending to the interior of the CPU cabinet 50 is provided in the cutout portion 545. Furthermore, a cover support mechanism 58 extending from the cabinet front portion 54 toward the cabinet back portion 55 is provided in a vicinity of the cutout portion 545. In addition, a first sensor switch 59 for detecting opening and closing of the front cover 60 is provided on an end portion of the cover support mechanism 58, which is closer to the cabinet back portion 55. The first sensor switch 59 is connected with the abovementioned gaming board 72. The cover support mechanism 58 and the first sensor switch 59 are later described in detail with reference to FIGS. 10 to 12.

The abovementioned hard disk 75 is installed on a face of the cabinet back portion 55 closer to the cabinet side portion 53. In addition, a rectangular-shaped cutout portion 551 is formed in an end portion of the cabinet back portion 55 that faces the abovementioned cover support mechanism 58.

The plate-shaped cabinet bottom portion 51 is configured as a bottom face of the CPU cabinet and includes an extending portion 56 extending forward from the cabinet front portion 54. The rectangular-shaped extending portion 56 is perpendicular to the cabinet front portion 54. Two hinges 563 and 565 are provided on a front edge portion of the extending portion 56 as an opening and closing member that allows the front cover 60 to be pivotally supported so as to be in open and close positions.

In addition, a circular-shaped bonding portion 561 that binds together a plurality of cables is provided on an end portion of the extending portion 56 adjacent to the cabinet side portion 52. A detailed configuration of the bonding portion 561 is described later with reference to FIG. 6.

Referring to FIG. 3 again, the front cover 60 is composed of a three-dimensional main cover 61 and a cover operating portion 62 coupled with the main cover 61, and the cover operating portion 62 that is operated by an administrator when opening and closing the front cover 60.

The main cover 61 includes a cover front portion 613 configuring a front face of the front cover 60 with the hinges 563 and 565 installed at a lower portion of the main cover 61, a cover upper portion 614 that is folded at an upper edge portion of the cover front portion 613 so as to configure an upper face of the front cover 60, and cover side portions 615 and 616 formed that are folded at both left and right edge portions of the cover front portion 613 so as to configure both left and right side walls of the front cover 60.

The cover operating portion 62 that configures an upper face of the front cover 60 is coupled with the cover front portion 613, the cover upper portion 614, and the cover side portion 615. A locking device 67 for retaining the front cover 60 in a closed state is provided at the cover operating portion 62. Therefore, the administrator can open and close the front cover 60 with a key (not shown) that is inserted into the locking device 67. In addition, as shown in FIG. 4, a rotational support portion 68 working with the abovementioned locking device 67 and a cube-shaped pressing portion 69 are provided on a back face of the cover operating portion 62. The locking device 67 and the rotational support portion 68 are described later with reference to FIGS. 8 and 9.

With referring to FIG. 3 again, when the front cover 60 is closed, the cover side portion 615 is flush with the cabinet side portion 52, the cover side portion 616 is flush with the cabinet side portion 53, and the cover upper portion 614 is flush with the opening surface of the CPU cabinet 50. In this way, when the front cover 60 is closed, the front cover 60 not only covers the connector panel 541 disposed on the cabinet front portion 54, the first communicating portion 542, the game cartridge 74, the cartridge slot 543, the second communicating portion 544, and the like, but also forms a three-dimensional housing space 63 at a front portion of the CPU cabinet 50.

Figure 5:
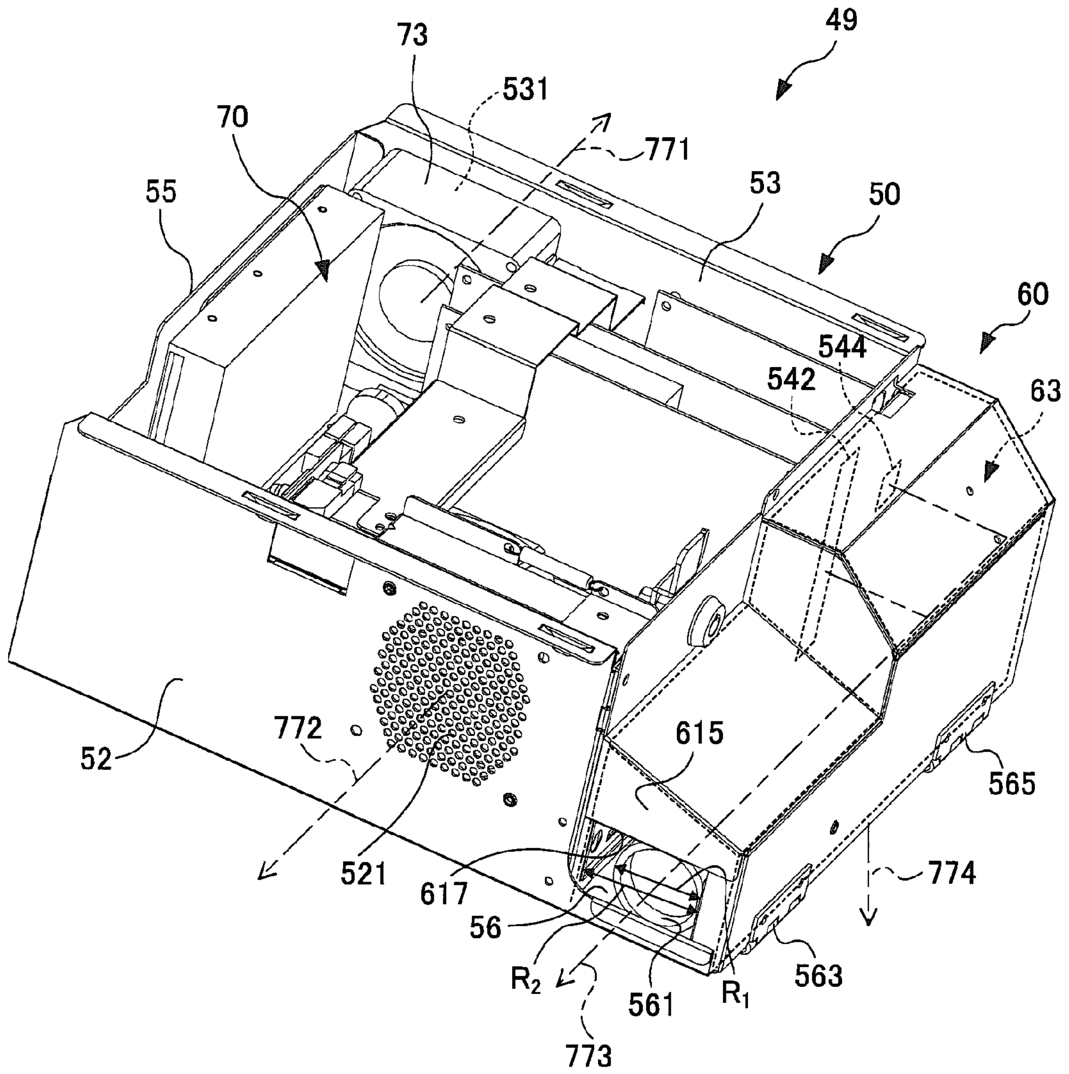

FIG. 5 is a perspective view showing a configuration of the main control unit 49. More specifically, FIG. 5 is a perspective view as seen from the cover side portion 615 of the front cover 60. As shown in FIG. 5, an exhausting portion 617 formed in a rectangular cutout is provided in the cover side portion 615. An end-to-end length of the exhausting portion 617 in a front-back direction is greater than that of the inner diameter of the bonding portion 561, that is, a length of an arrow $R_2$ is greater than an arrow $R_1$. In other words, a dimension of an opening space of the exhausting portion 617 is larger than that of the bonding portion 561.

Next, an exhausting route of heat generated in the CPU cabinet 50 is described with reference to FIG. 5. It is possible for heat generated at the control device 70 disposed in the CPU cabinet 50 to be discharged outside of the CPU cabinet 50 through a plurality of routes, even if the front cover 60 is closed.

More specifically, for example, as shown by a broken line 772, heat in the CPU cabinet 50 can be exhausted from the heat exhausting portion 521. In addition, as shown by a broken line 771, heat in the CPU cabinet 50 can be exhausted by the fan 73 from the heat rejecting portion 531.

Furthermore, the internal space of the CPU cabinet 50 communicates with the housing space 63 via the first communicating portion 542 and the second communicating portion 544 formed in the cabinet front portion 54. In this way, as shown by a broken arrow 773, heat in the CPU cabinet 50 can be exhausted outside of the main control unit 49 via the first communicating portion 542 and the second communicating portion 544, the housing space 63, and the exhausting portion 617.

In addition, as shown by the broken line 774, heat generated in the CPU cabinet 50 can be exhausted through the first communicating portion 542 and the second communicating portion 544, the housing space 63, and a gap portion between the cover front portion 613 and the extending portion 56. Although the exhausting routes of heat generated in the CPU cabinet 50 are described, the present invention is not limited thereto.

Figure 6:
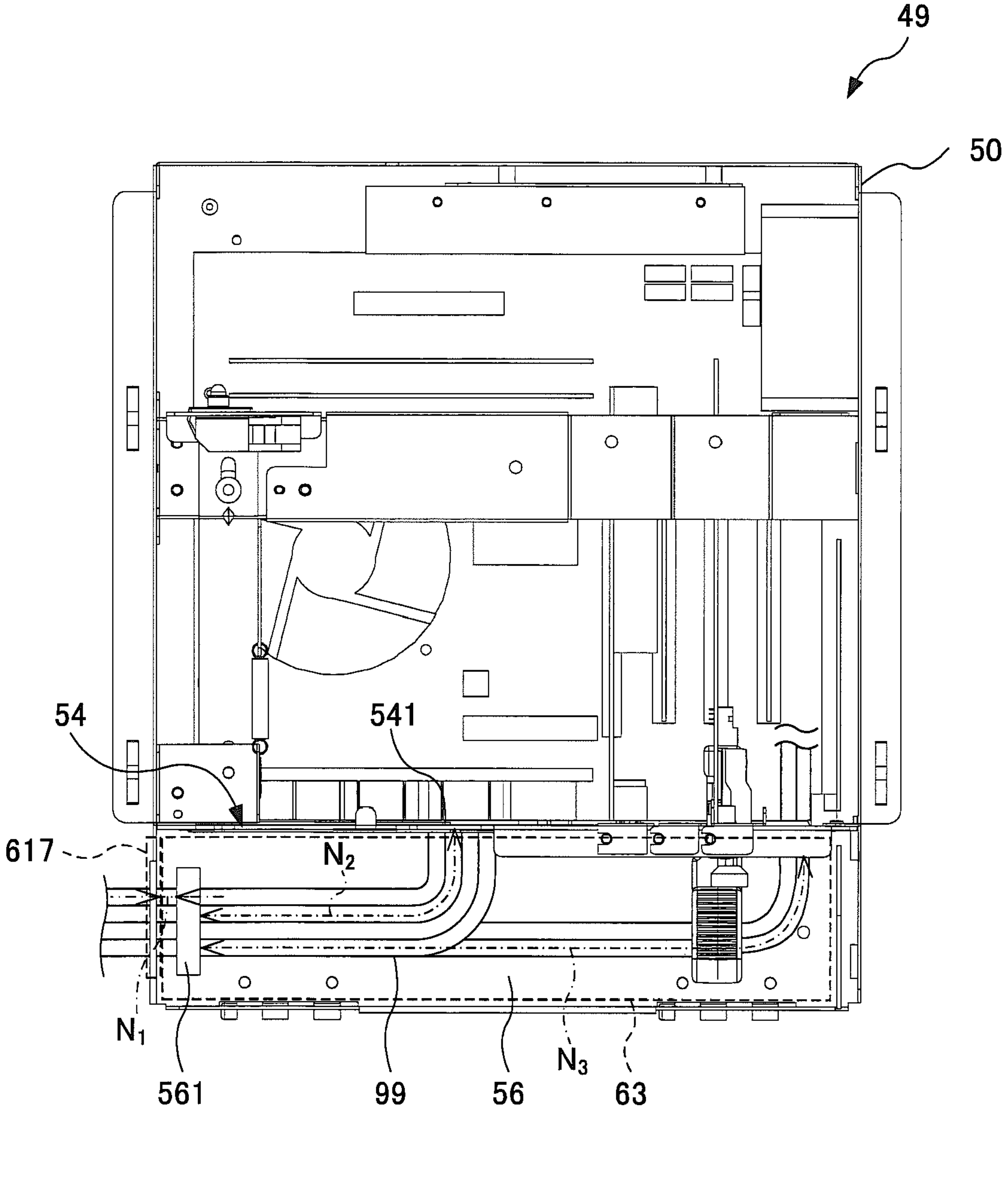
FIG. 6 is a top view showing a configuration of an extending portion according to the embodiment.

FIG. 6 is a top view showing a configuration of the extending portion 56 in which a plurality of cables 99 are placed. To simplify the description, the front cover 60 is not shown, and the exhausting portion 617 of the front cover 60 and the housing space 63 formed while closing the front cover 60 are shown by broken lines.

The plurality of cables 99 include cables of which each terminal is connected with the connector panel 541 and cables extending from an inside of the CPU cabinet 50. The plurality of cables 99 extends from the cabinet front portion 54 to the housing space 63, reaching the outside of the housing space 63 via the exhausting portion 617.

Here, as shown in FIG. 6, the bonding portion 561 for bonding the plurality of cables 99 is arranged to lie closer to the exhausting portion 617 between the exhausting portion 617 and terminals of the plurality of cables 99 extending from the connector panel 541. More specifically, suppose three dimensions $N_1$, $N_2$, and $N_3$: $N_1$ is an interval between the bonding portion 561 and the exhausting portion 617; $N_2$ is a length from the cabinet front portion 54 to the bonding portion 561, which is defined for a cable of which a terminal is connected with the connector panel 541; and $N_3$ is a length from the cabinet front portion 54 to the bonding portion 561, which is defined for a cable extending from the inside of the CPU cabinet 50. $N_1$ is arranged so as to be shorter than $N_2$ and $N_3$. That is, the plurality of cables 99 are bonded in the proximity of the exhausting portion 617, and extends from the exhausting portion 617 to the outside of the housing space 63. In addition, as shown in FIG. 5, a length of the exhausting portion 617 in a front-back direction (a length of an arrow $R_2$ in FIG. 5) is longer than the inner diameter of the bonding portion 561 (a length of an arrow $R_1$ in FIG. 5). Accordingly, a dimension of an opening area of the exhausting portion 617 is larger than that of the bonding portion 561. In this way, it is possible to prevent the exhausting portion 617 from being filled with the plurality of cables 99, protecting against degradation of performance associated with heat rejection.

Next, a procedure of installing the main control unit 49 thus configured into the cabinet 2 is described with reference to FIG. 7.

Figure 7:
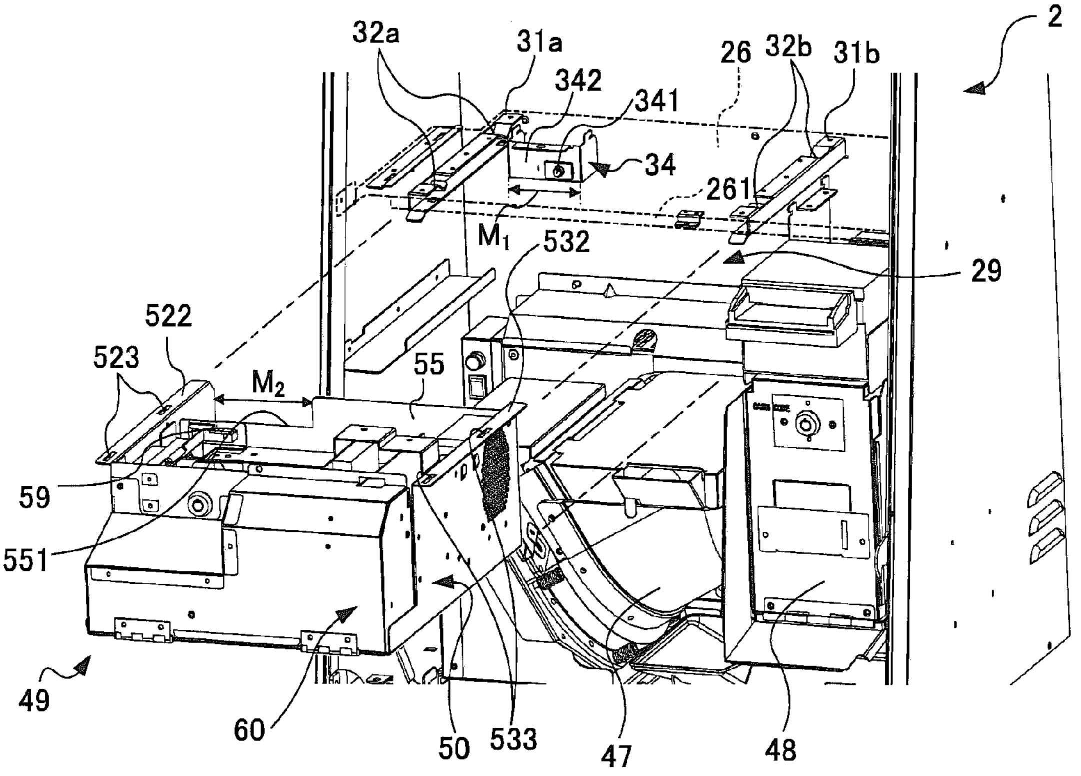
FIG. 7 is a perspective view showing a configuration of a cabinet lower portion according to the embodiment.

FIG. 7 is a perspective view showing a configuration of the cabinet lower portion 29. As shown in FIG. 7, guiding members 31*a* and 31*b* extending in a front-back direction in the cabinet 2 are provided in parallel to each other on a rear face of the lower shelf board 26 facing the cabinet lower portion 29, and a switch unit 34 is provided between these guiding members 31*a* and 31*b*. The guiding members 31*a* and 31*b* each have a cross section formed in a U-shaped guiding groove, and concave portions 32*a* and 33*b*. In addition, a front end portion of the lower shelf board 26 is folded to form into a flapping portion 261. The flapping portion 261 horizontally extends between both ends of an inner wall of the cabinet 2, and also extends downward toward the front portion of the main control unit 49.

The switch unit 34 includes a second sensor switch 341 for detecting the opening and closing of the front cover 60 of the CPU cabinet 50, and a switch box 342 that serves as a bracket on the lower shelf board 26, to which the second sensor switch 341 is secured so as to face the back portion of the CPU cabinet 50. More specifically, when the CPU cabinet 50 is installed in the cabinet 2, the switch box 342 allows the second sensor switch 341 to be positioned so as to face the first sensor switch 59. In addition, the second sensor switch 341 is connected with the gaming board 72.

When the main control unit 49 is mounted onto the cabinet 2, the bent portions 522 and 532 are inserted into the guiding grooves of the guiding members 31*a* and 31*b*, and then the CPU cabinet 50 is inserted into the cabinet 2, starting with the back portion thereof. When the CPU cabinet 50 is inserted up to a predetermined mounting position, the concave portions 32*a* and 32*b* formed in the guiding members 31*a* and 31*b* are fitted with the fitting bores 523 and 533 formed in the bent portions 522 and 532, respectively, so that the CPU cabinet 50 is mounted onto the predetermined mounting position in the cabinet 2.

Here, as described above, the cutout portion 551 is formed in the cabinet back portion 55 of the CPU cabinet 50. A horizontal end-to-end length $M_2$ of the cutout portion 551 is greater than $M_1$ of the switch box 342. Thus, the CPU cabinet 50 can be attached and detached without interference by the switch box 342 of the second sensor switch 341, and the switch box 342 can cover the cutout portion 551 of the CPU cabinet 50 while the CPU cabinet 50 is installed in the cabinet 2. Therefore, the CPU cabinet 50 can be easily attached and detached from the cabinet 2 while maintaining the security of the back portion of the CPU cabinet 50.

The exhausting portion 617 of the main control unit 49 is placed, as shown in FIG. 2, by mounting the main control unit 49 onto the cabinet 2. More specifically, suppose distances $L_1$ and $L_2$: $L_1$ is a distance from a first inner wall of the cabinet 2 to the cover side portion 615 of the front cover 60; and $L_2$ is a distance from a second inner wall of the cabinet 2 to the cover side portion 616 of the front cover 60. The front cover 60 is arranged such that the distance $L_1$ is shorter than the distance $L_2$. That is, the exhausting portion 617 provided in the cover side portion 615 is arranged to lie closer to the first inner wall.

Here, for example, contrary to the gaming machine 1 of the present embodiment as described above, it is assumed that the front cover 60 is arranged in the cabinet 2 so that the distance $L_1$ is longer than the distance $L_2$. When compared with the gaming machine 1 of the present embodiment, a larger space is formed between the exhausting portion 617 and the first inner wall of the cabinet 2. Accordingly, it is likely that there is an increased risk of attempts at tampering for the inner space of the CPU cabinet 50 and the front portion via the exhausting portion 617.

In the gaming machine 1 of the present embodiment, as described above, the front cover 60 is arranged so that the distance $L_1$ is shorter than the distance $L_2$. Accordingly, the front cover 60 protects the motherboard 71 and the gaming board 72 provided in the CPU cabinet 50, the connector panel 541 provided at the front portion of the CPU cabinet 50, the game cartridge 74, the cartridge slot 543, and the like. Simultaneously, heat generated by the game cartridge 74 as well as the motherboard 71 and the gaming board 72 is transferred to the housing space 63 formed between the front cover 60 and the front portion of the CPU cabinet 50 via the first communicating portion 542 and the second communicating portion 544. Subsequently, the heat is rejected via the exhausting portion 617, which is geometrically arranged so as to prevent attempts at tampering. Therefore, the heat generated inside and at the front portion of the CPU cabinet 50 can be efficiently exhausted while maintaining the security for these portions.

In addition, as described above, the supporting members 23U and 23D, supporting pivotally the front door 22, are provided on the end portion of the cabinet 2. Accordingly, the exhausting portion 617 of the front cover 60 lies in the vicinity of an axis about which the front door 22 is allowed to pivot. In this way, even if the front cover 60 in the cabinet 2 is exposed while the front door 22 is open, a space where the exhausting portion 617 may receive attempts at tampering is hardly produced on the end portion of the cabinet. Accordingly, it is possible to prevent attempts at tampering from being carried out for: the connector panel 541 and the game cartridge 74 (see FIG. 4) provided on the front portion of the CPU cabinet 50 through the exhausting portion 617; and the motherboard 71 and the gaming board 72 provided in the CPU cabinet 50 through the exhausting portion 617, the first communicating potion 542, and the second communicating portion 544.

Next, the locking device 67 and the rotational support portion 68 are described with reference to FIGS. 8 and 9.

Figure 8:
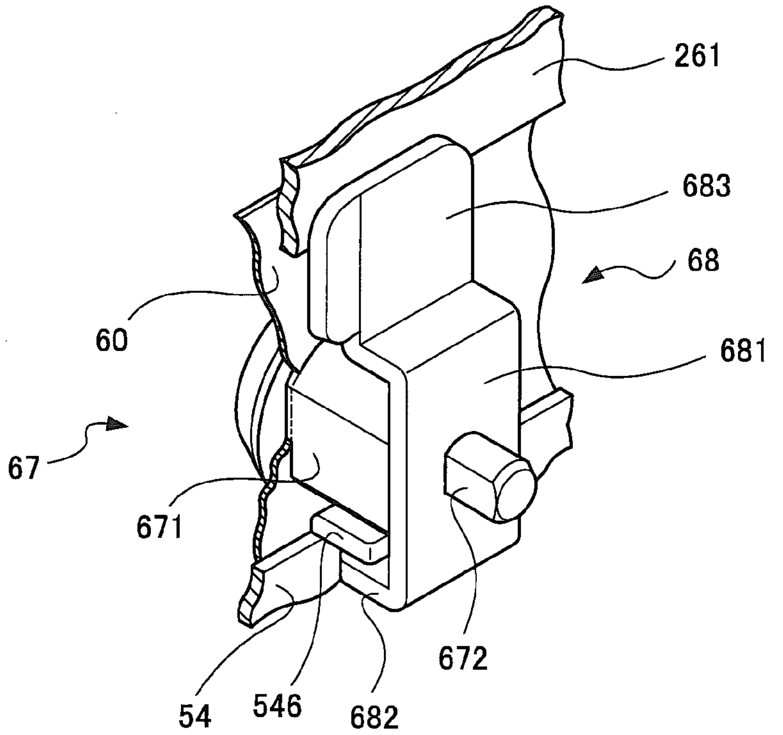
FIGS. 8 and 9 are perspective views showing a configuration of a locking portion and a rotational support portion according to the embodiment.
Figure 9:
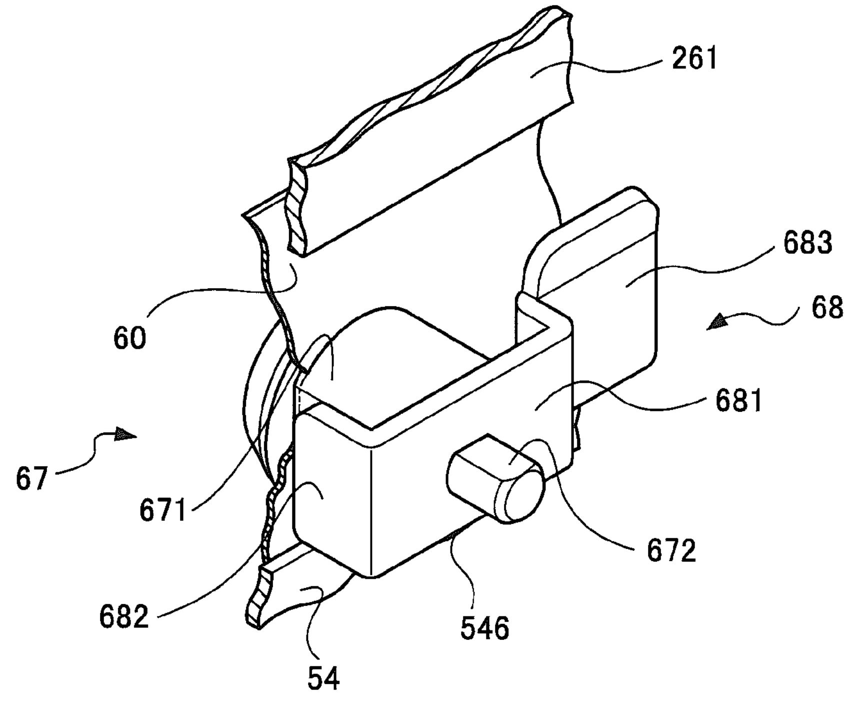

FIGS. 8 and 9 are perspective views showing configurations of the locking device 67 and the rotational support portion 68 while the CPU cabinet 50 is mounted onto the cabinet 2 with the front cover 60 in a close position.

As shown in FIG. 8, the locking device 67 includes a cylindrical-shaped key cylinder 671 into which a key (not shown) is inserted and a pin 672 extending from the key cylinder 671 to the inside of the CPU cabinet 50. The pin 672 can be rotated only when the key is inserted in the key cylinder 671. That is, the pin 672 can only be rotated while interlocking with the key inserted in the key cylinder 671.

The rotational support portion 68 having a shape of a plate includes a main body 681, a first locking part 682, and a second locking part 683. The main body 681 is coupled with the pin 672 of the locking device 67. The first locking part 682 disposed on a first end of the main body 681 is capable of locking the convex portion 546 of the cabinet front portion 54 from the inside of the CPU cabinet 50. The second locking part 683 disposed on a second end of the main body 681 is capable of locking the flapping portion 261 of the cabinet 2. In addition, the second locking part 683 is configured to lock the flapping portion 261 from the inside of the CPU cabinet 50 while the first locking part 682 is locked with the convex portion 546. Thus, it is possible for the locking device 67 to maintain the front cover 60 in a closed position. In this way, since the locking device 67 protects the front cover 60 from being easily opened, it can improve security of the inside and the front portion of the CPU cabinet 50.

That is, the locking device 67 is capable of selecting two positions, locked and released positions as shown in FIGS. 8 and 9, respectively. In the locked position, rotation of the key inserted into the locking device 67 allows the first locking part 682 to be locked with the convex portion 546 and the second locking part 683 to be locked with the flapping portion 261. In the released position on the other hand, since the first and second locking parts 682 and 683 are released from the convex portion 546 and the flapping portion 261, respectively, the front cover 60 can be opened and closed.

In addition, it is possible to lock the front cover 60 in a closed position if the key is pulled out of the locking device 67 while the rotational support portion 68 is held in a locked position. This improves security of the inside and the front portion of the CPU cabinet 50.

Next, the cover support mechanism 58 is described with reference to FIGS. 10 to 12.

Figure 10:
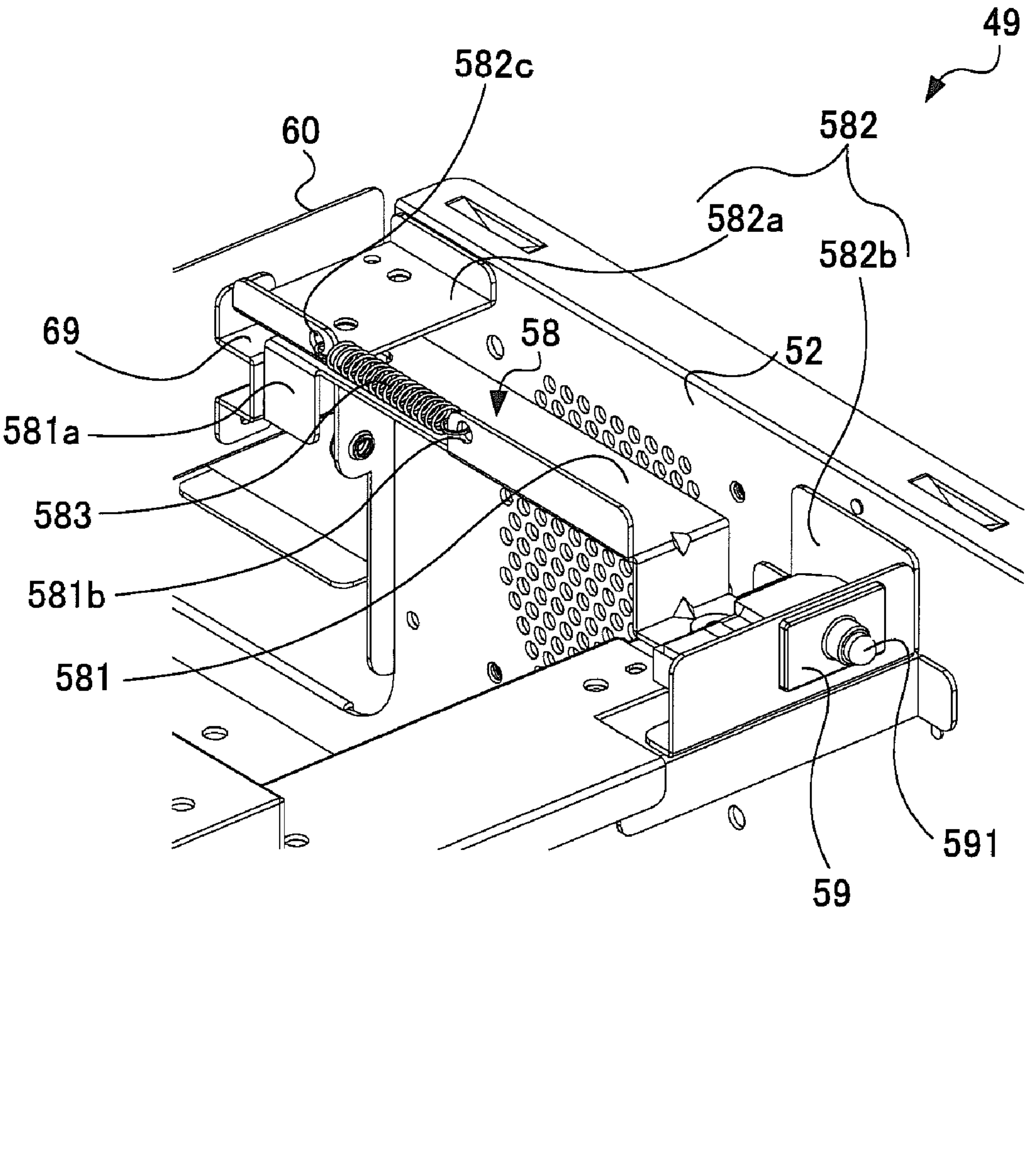
FIG. 10 is a perspective view showing a configuration of a cover support mechanism according to the embodiment.

FIG. 10 is a perspective view showing a configuration of the cover support mechanism 58. As shown in FIG. 10, the cover support mechanism 58 includes a main body 581, a main body support portion 582, and a biasing member 583. The main body 581 serves as a rod-shaped pressing support portion that extends in a front-to-back direction in the CPU cabinet 50. The main body support portion 582 slidably supports the main body 581 in the CPU cabinet 50. The biasing member 583 biases the main body 581 toward the cabinet front portion 54.

The main body 581 extends from the cabinet front portion 54 to the reinforcing member 57 in the CPU cabinet 50. For convenience sake of explanation, front and back terminal sides are used to refer to both end portions of the main body 581 as follows: the front terminal side represents an end portion of the main body 581 closer to the reinforcing member 57 and a back terminal side represents the opposite end portion closer to the cabinet front portion 54. The first sensor switch 59 is installed on the front terminal side of the main body 581. The contact portion 581*a* abutting the pressing portion 69 of the front cover 60 is provided on the back terminal side. A hole 581*b* for hooking a first end of the biasing member 583 is provided in the center of the main body 581. In addition, the first sensor switch 59 is connected with the abovementioned gaming board 72.

The main body support portion 582 includes a front terminal support portion 582*b* for supporting the front terminal side of the main body 581 and a back terminal support portion 582*a* for supporting the back terminal side of the main body 581. The front terminal support portion 582*b* is attached to the reinforcing member 57 and slidably supports the main body 581 in a front-to-back direction in the CPU cabinet 50. The back terminal support portion 582*a* is attached to the cabinet side portion 52 and slidably supports the main body 581 in a front-to-back direction. In addition, a hole 582*c* for hooking a second end of the biasing member 583 is formed in the back terminal support portion 582*a*. Thus, the main body 581 can be moved between a back position where the main body 581 is slid back (see FIG. 11) and a forward position where the main body 581 is slid backward (see FIG. 12).

The biasing member 583 is a so-called tension spring. Both hooks at the ends of the biasing member 583 are inserted into the hole 581*b* and the hole 582*c* respectively while the biasing member 583 is pulled. The main body 581 that is continuously biased backward by the biasing member 583 is positioned at the abovementioned back position as long as any other external force does not act on the main body 581.

Movement of the cover support mechanism 58 with the abovementioned configuration is described. FIGS. 11 and 12 are top views showing the movement of the cover support mechanism 58 that accompanies opening and closing of the front cover 60, while the CPU cabinet 50 is installed in a predetermined position inside the cabinet 2. FIGS. 11 and 12 show the movement for the front cover 60 in open and closed positions, respectively.

Figure 11:
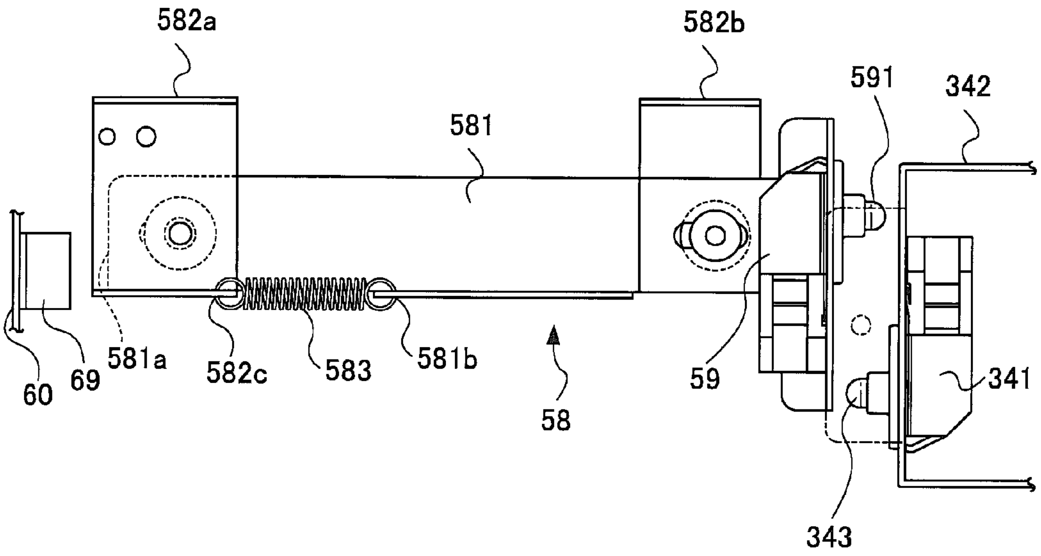
FIGS. 11 and 12 are top views showing a configuration of a cover support mechanism according to the embodiment.

As shown in FIG. 11, when the CPU cabinet 50 is installed at a predetermined position in the cabinet 2, a pressure receiving portion 591 of the first sensor switch 59 and a pressure receiving portion 343 of the second sensor switch 341 face each other. The pressure receiving portions 591 and 343 are in an OFF state without external force, and turn to an ON state when they are pressed.

As shown in FIG. 11, when the front cover 60 is opened and the pressing portion 69 of the front cover 60 lies apart from the contact portion 581*a* of the main body 581, the main body 581 is biased by the biasing member 583 to move back to the abovementioned back position. Accordingly, the pressure receiving portion 591 of the first sensor switch 59 and the pressure receiving portion 343 of the second sensor switch 341 do not abut any object, so that these sensor switches 59 and 341 are in an OFF state, respectively.

Figure 12:
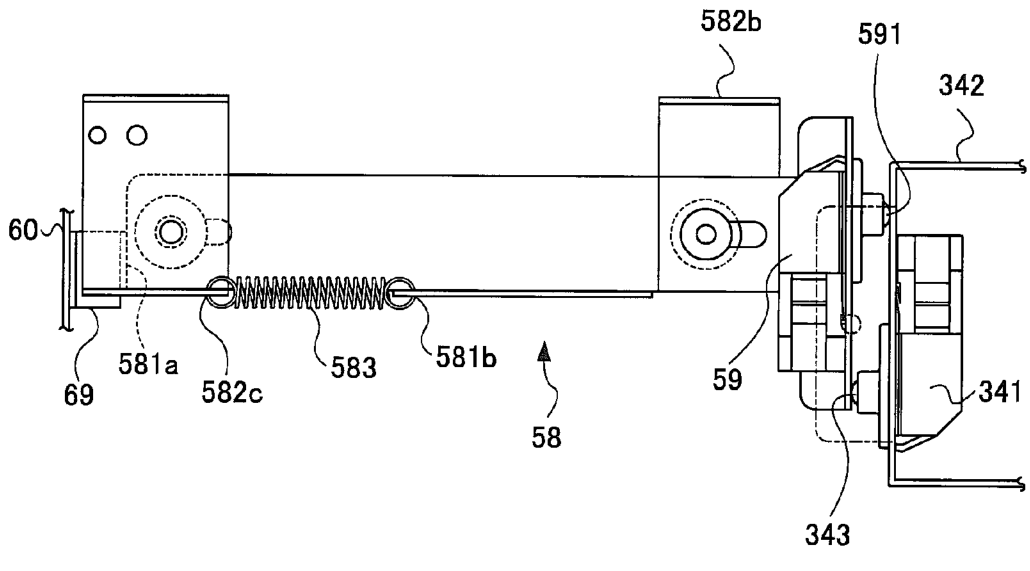

As shown in FIG. 12, when the pressing portion 69 of the closed front cover 60 depresses the contact portion 581*a* of the main body 581, the main body 581 moves forward against the contraction force exerted by the biasing member 583, so that the main body 581 is positioned at the forward position. Accordingly, the switch box 342 depresses the pressure receiving portion 591 of the first sensor switch 59, and a front terminal portion of the main body 581 depresses the pressure receiving portion 343 of the second sensor switch 341. Thus, the first sensor switch 59 and the second sensor switch 341 turn to an ON state, respectively.

Thus, the rotational support portion 68 arranged at a supporting position of the front cover 60 allows the front cover 60 to be closed without rattling. That is, when the front cover is closed, the pressing portion 69 of the front cover 60 presses the main body 581. Simultaneously, the biasing member 583 biases the main body 581 toward the pressing portion 69. Consequently, the resulting force for maintaining the front cover 60 in a closed position is enhanced. In this way, rattling of the front cover 60 can be prevented.

When the first sensor switch 59 changes from ON to OFF, it outputs first information for indicating that the front cover 60 has changed from the closed state to the opened state to the gaming board 72 and the motherboard 71 of the control device 70. Similarly, when the second sensor switch 341 changes from ON to OFF, it outputs second information for indicating that the front cover 60 has changed from the closed state to the opened state to the gaming board 72 and the motherboard 71 of the control device 70. These two sensor switches 59 and 342 implement the security of the inside and the front portion of the CPU cabinet 50. In addition, for example, if an alarm is notified of opening the front cover 60 based on the first information sent from the first sensor switch 59, the security of the inside and the front portion of the CPU cabinet 50 can be further enhanced.

The first and second information outputted from the first sensor switch 59 and the second sensor switch 341 is sent to the motherboard 71 through the gaming board 72, respectively, and stored as a log in a first memory provided on the motherboard 71 and a second memory provided on the gaming board 72. Thus, the log stored in duplicate in the first memory and the second memory can be more accurate.

In addition, a plurality of the gaming machines 1 as configured above are installed in an amusement facility such as a casino and are communicably connected to a server for monitoring these gaming machines. In this case, the second information outputted from the abovementioned second sensor switch 341 is transmitted to the server and stored as a log in memory provided on the server. Thus, the server can also monitor an opened and closed state of the front cover 60.

As above, embodiments according to the present invention have been described; however, the present invention is not limited to these embodiments.

In the abovementioned embodiments, although so-called pressing sensors having the pressure receiving portions 591 and 343 are used as the first sensor switch 59 and the second sensor switch 341, respectively, the present invention is not limited thereto. For example, a so-called photo-interrupter, infrared sensor, and the like may alternatively be used as the first and second sensor switches.

In the abovementioned embodiments, although the front door 22 is rotatably supported by the supporting members 23U and 23D, the present invention is not limited thereto. For example, the front door may alternatively be supported rotatably by a hinge. In addition, for example, a single axis extending along one end of a cabinet may alternatively be provided so that the front door is supported rotatably by the single axis.

What is claimed is:

1. A gaming machine, comprising:

a first box having inner walls;

a second box housed by the first box, the second box housing a control board that includes a central processing unit for controlling a game;

a front member having side walls, the front member covering components required for executing the game placed at a front portion of the second box while the front portion of the second box is closed, and the front member defining a first space at the front portion of the second box;

a communicating portion provided at the front portion of the second box, the communicating portion allowing a second space inside the second box to communicate with the first space;

a plurality of cables extending from the front portion of the second box to the first space;

a bonding portion for bonding the plurality of cables; and an exhausting portion provided in a side wall of the front member, the exhausting portion allowing air sent from the second space inside the second box to the first space to be discharged, wherein the front member is arranged to lie such that a first distance is smaller than a second distance, where the first distance starts at a first inner wall at an end portion of the first box to finish at a first side wall at an end portion of the front member, and the second distance starts at a second inner wall at the opposite end portion of the first box to finish at a second side wall at the opposite end portion of the front member;

wherein the plurality of cables extend out of the first space via the exhausting portion; and wherein the bonding portion is arranged to lie closer to the exhausting portion between the exhausting portion and the front portion of the second box from which the plurality of cables start to extend.

2. The gaming machine according to claim 1, further comprising:

an extending portion that extends forward from a bottom of the second box; and a hinge provided a front end portion of the extending portion, the hinge pivotally supporting the front member.

3. The gaming machine according to claim 1, further comprising a front door, wherein the front door is placed at a front of the first box and pivotally supported about an axis that extends along an end portion of the first box so as to be in open and closed positions.

4. The gaming machine according to claim 1, further comprising:

a pressing portion provided in the front member;

a support portion facing the pressing portion while the front member is in a closed position; and a biasing member that biases the support portion toward the pressing portion.

5. The gaming machine according to claim 1, further comprising a first sensor that detects the transition of the front member from a closed position to an open position, wherein the first sensor outputs first information related to releasing of the closed position when the front member changes from a closed position to an open position.

6. The gaming machine according to claim 5, further comprising a first memory that stores the first information sent from the first sensor.

7. The gaming machine according to claim 6, further comprising a second memory that stores the first information sent from the first sensor.

8. The gaming machine according to claim 5, further comprising a second sensor that detects the transition of the front member from a closed position to an open position, wherein the second sensor outputs second information related to releasing of the closed position when the front member changes from a closed position to an open position.

9. The gaming machine according to claim 8, wherein the gaming machine is communicatively connected with a server, and the second information sent from the second sensor is transmitted to the server.

10. The gaming machine according to claim 8, wherein the first box includes a mounting device to which the second sensor is attached so as to face a back portion of the second box, and a cutout that allows the mounting device to pass is provided in the back portion of the second box.

11. The gaming machine according to claim 1, further comprising:

a rotational support portion rotatably provided at the front member, wherein the second box has a convex portion provided at a front portion thereof, the convex portion extending inside the second box, a first end portion of the rotational support portion has a first locking part that locks the convex portion, and the rotational support portion is switchable between a locked position and a released position, wherein when the rotational support portion is in a locked position, the rotational support portion allows the first locking part to lock the convex portion such that the front member is maintained in a closed position, and when the rotational support portion is in a released position, the rotational support portion allows the first locking part to release the convex portion such that the front member is openable.

12. The gaming machine according to claim 11, wherein the first box has a flapping portion that extends from the first inner wall to the second inner wall and extends downward toward the front portion of the second box, a second end portion of the rotational support portion has a second locking part, and while the first locking part locks the convex portion, the second locking part locks the flapping portion such that the front member is maintained in a closed position.

13. The gaming machine according to claim 1, wherein the front member includes a locking device.

* * * * *